United States Patent [19]

Ashihara et al.

[11] Patent Number: 5,130,373
[45] Date of Patent: Jul. 14, 1992

[54] COATING RESIN COMPOSITES FOR THE USE OF POLYOLEFIN RESINS

[75] Inventors: Teruaki Ashihara; Shingo Tone, both of Hyogo; Ryozo Orita, Himeji, all of Japan

[73] Assignee: Toyo Kasei Kogyo Company Limited, Osaka, Japan

[21] Appl. No.: 698,779

[22] Filed: May 13, 1991

[30] Foreign Application Priority Data

May 18, 1990 [JP] Japan .................................. 2-129489

[51] Int. Cl.$^5$ ...................... C08L 23/28; C08L 51/06
[52] U.S. Cl. .................................. 525/193; 525/112; 525/126; 525/183; 525/227; 525/285; 525/286; 525/293; 525/301; 525/303; 525/309
[58] Field of Search ............... 525/193, 126, 285, 301, 525/303, 309

[56] References Cited

U.S. PATENT DOCUMENTS 4,112,013  9/1978  Briggs et al. .................... 525/301

OTHER PUBLICATIONS

Abstract (ACS) of published JP Patent No. 18434 (1987).
Abstract (ACS) of published JP Patent No. 95369 (1987).
Abstract (ACS) of published JP Patent No. 95372 (1987).

*Primary Examiner*—Carman J. Seccuro
*Attorney, Agent, or Firm*—Wenderoth, Lind & Ponack

[57] ABSTRACT

Polyolefin type coating resin compositions obtained by copolymerizing acrylic type oligomers, polydienes, acrylic type monomers and chlorinated polyolefins containing 10-60 weight % chlorine in the existence or the absence of the Hardener. The obtained copolymers are used for coatings, printing inks or adhesives applying as one coat finish or primer to give excellent coating films of adhesive property, solvent resistance and the appearance.

7 Claims, No Drawings

COATING RESIN COMPOSITES FOR THE USE OF POLYOLEFIN RESINS

BACKGROUND OF THE INVENTION

1. Field of the Invention

The present invention relates to resin coating compositions for use as coatings for polyolefin-type resins. The resin compositions of the present invention are useful as primer coatings for polyolefin resins. They are also useful as one coat finishing coatings for, casts and films formed of polyolefin-type resins. The coating compositions produce coatings having good adhesive properties, solvent resistance properties and excellent appearance.

2. Description of the Prior Art

The use of polyolefin resins is widespread in the manufacturing industry, for instance in the manufacture of motor vehicles and electric appliances. Such widespread use is due to certain desirable properties possessed by polyolefin resins; for instance they are waterproof, heat proof, resistant to chemicals and electrically insulating. Furthermore, such resins are relatively cheap to produce. For these reasons, demand for such materials is increasing. However, in spite of the merits of the polyolefin resins described above, such resins are crystalline and the formation of strongly adherent coatings on articles formed from such resins are difficult to achieve. It has previously been proposed to enhance the adhesive properties of coated film by subjecting the surface of the polyolefin resin to an acid treatment or to a physical treatment such as corona discharge. Unfortunately, surface treatment by the above physical method is complicated and is costly.

With reference to the improved method of the above process in the case of the surface coating, for example, the coating of the automobile bumpers, many primer compositions have been suggested in order to avoid the need for surface treatments (for instance, see published unexamined patent application No. 95372, 1987 and published unexamined patent application No. 95369, 1987 in Japan). However, the polyolefin-type compositions suggested therein are not sufficiently adhesive to the polyolefin-type resins. Furthermore, according to this prior proposal, a top coat must be provided over the primer coating on the base material which makes the process more complicated. As the coating compositions used for one coat finishing are suggested blends of chlorinated polyolefins and the copolymerized compositions (published unexamined patent application No. 18434, 1987 in Japan).

Unfortunately, however, such blends have inferior weather resistance, humidity resistance and solvent resistance properties and poor film hardness. In order to improve these defects, it has been suggested that a blend of a polymer of an acrylic type or polyurethane type resin with the chlorinated polyolefin could be used (published unexamined patent application No. 15227, 1989 and No. 85226, 1989 in Japan).

SUMMARY OF THE INVENTION

Originally, the polymers which improve the property of the coated film obtained by blending the acrylic or urethane polymers with chlorinated polyolefin compositions are fundamentally incompatible with the chlorinated polyolefins and the gloss of the coated film is low and the dispersibility of any pigment therein is inferior. Even the modification of such polymers using an acrylic monomer (for example, unexamined published patent application No. 18434, 1987 in Japan described above) does not necessarily outweigh the bad influence caused by the presence of a monomer on the light fastness, the solvent resistant property and hardness of the coated film. In view of the above described problems of the prior art, the aim of the present invention is to accomplish the following objects (1)-(4):

(1) The chlorinated polyolefins are modified and the modified chlorinated polyolefins improve the adhesive property and the adhesion of the coated film.

(2) Functional groups are introduced to the chlorinated polyolefins and these polyolefins can undergo a hardening reaction.

(3) The compatibility of the chlorinated polyolefins can be improved by improving the compatibility of the chlorinated polyolefins with other polymers or the urethane polymers.

(4) Dispersion of pigments in the coating compositions is improved.

DETAILED DESCRIPTION OF THE INVENTION

To attain the above described objects, the present invention is concerned with polyolefin resin compositions containing a main ingredient made from the resins which are obtained by the copolymerization of at least one acrylic oligomer (A), at least one polydiene (B), at least one acrylic monomer (C) and at least one chlorinated polyolefin (D) containing 10–60 weight % chlorine.

It is desirable that component (A) comprises one or more acrylic oligomers containing one or more than 2 radicals selected from hydroxyl, carboxyl, carboxyl anhydride and amino radicals and/or comprises one or more acrylic oligomers having no functional groups. The coating compositions of the present invention may optionally contain one or more hardeners to react with the functional groups in A and/or B and/or C. In the case when the hydroxyl value of the resin obtained by the copolymerization of (A), (B), (C) and (D) is 10–250 KOHmg/g, preferably 15–200 KOHmg/g as solid matter, the present invention fulfills its function. In the case when the hydroxyl value of the above described resin is lower than 10 KOHmg/g, the crosslinking density of the resin to the polyisocyanate becomes low, and the solvent resistance and humidity resistance properties of the coated film are reduced. When the hydroxyl value is greater than 250 mg/g, phase separation occurs in the interior of the copolymerization resin and so the outer appearances of the coated film and the solution are damaged. In the case where the resin obtained by the copolymerization of (A), (B), (C) and (D) contains carboxyl and/or maleic anhydride groups, the acid value of said resins will be in the range of from 5 to 250 KOHmg/g, preferably 10 to 200 mg/g.

When the copolymerization resins contain amino and/or amino radicals, they should be present in amounts sufficient to yield the aforementioned general hydroxyl and/or carboxyl value range.

The acrylic oligomers typically used in the present invention are compounds which have definite repeating units and have one or two double bonds in the molecules, and also the so-called macromers or the macromonomers are included in the molecule as a matter of course. Formerly, the macromers or the macromonomers (which are designated as the "macromonomers"

hereinafter) are indicated to be compounds which have the double bond at the terminal of the molecules, but the macromonomers used in the present invention include compounds which have functional radicals, such as hydroxyl or the carboxyl radicals at both terminals of the molecule. The molecular weight of these macromonomers used in the present invention is in the range of several hundred to ten thousand; and copolymers whose structure controls the coating film properties of the copolymer are obtained Acrylic oligomers (A) described above are, for example, the modified caprolactoneacrylic or the methacrylic (abbreviated as (meta)acrylic, hereinafter) esters containing primary hydroxyl groups, (meta)acrylic acid ester oligomers containing hydroxyl groups at the terminal of the molecule, oligoester (meta)acrylate, polyester(meta)acrylate, urethane(meta)acrylate epoxy(meta)acrylate, etc. In the above described compounds are included the compounds containing hydroxyl, carboxyl, acid anhydride or amino radicals. Moreover, there are included styrenemacromonomers having a methacroyl radical at the terminal of the molecule, butylacrylate macromonomers, styrenemacromonomers having hydroxyl radicals at the terminal of the molecule, styrene/acrylonitrile macromonomers, styrene macromonomers having dicarboxyl radicals at the terminal of the molecule, styrene/acrylonitrile macromonomers having dicarboxyl radicals at the end of the molecule, butylacrylate macromonomers, isobutylmethacrylate macromonomers having a methacroyl radical at the terminal of the molecule, which compounds all have functional groups at the terminal of the molecules as described above. Furthermore, the polydiene (B) is a component which improves the compatibility between the acrylic oligomers (A) and their copolymers, and the chlorinated polyolefins (D) and the acrylic type monomers (C).

Examples of the polydiene components (B) include polybutadiene, polypentadiene, polyisobutylene and polychloroprene, etc. For example, as the polybutadiene, one may use a liquid type polybutadiene obtained by the polymerization of a butadiene monomer in the presence of a catalyst. The polybutadiene may be substituted by a hydroxyl, carboxyl, acid anhydride or an epoxy radical at the terminal or in the internal part of the molecule.

Examples of other liquid dienes include liquid-gums, such as liquid chloroprene, liquid isoprene and liquid polypentadiene. Among the many polydienes described above, a polydiene especially useful for the present invention is that which has compatibility with the chlorinated polyolefins, and at the same time, has compatibility with (A) or (C) or its copolymers. Moreover, it is possible for the liquid gum to exhibit the useful coating film properties when the compounds can effectively use the functional groups existing at the terminal or the internal part of the molecule.

When the composition includes a polyisocyanate, as a hardener, it is necessary to include radicals containing reactive H atoms, such as hydroxyl, carboxyl, amino, acid anhydride or amino radicals.

For the acrylic type monomer component (C), one may use a monomer having a functional group as described above or a mixture of monomers or a mixture of monomers having a functional group and one having no functional group. As the (meta)acrylic monomer having hydroxyl radicals, examples include (meta)acrylic acid-2-hydroxylethyl, (meta)acrylic acid-2-hydroxypropyl etc.

As the (meta)acrylic monomer having no hydroxyl radicals, examples include (meta)acrylic acid, (meta)acrylic acid methyl, (meta)acrylic acid ethyl, (meta)acrylic acid butyl, (meta)acrylic acid-2-ethyl hexyl, (meta)acrylic acid lauryl, (meta)acrylic acid dimethyl aminoethyl and (meta)acrylic acid glycidyl esters. The chlorinated polyolefin components of the present invention are those which impart adhesive properties to the coating films. The chlorine content of (D) should be in the range of 10–60 weight %, preferably 20–50 weight %. In such a case, when the chlorine content is under 10 weight %, the stability of the solution is lowered, and the appearance of the coated film is inferior. When the chlorine content is over 60 weight %, the adhesive properties of the coating compositions to the polyolefin resins is lowered. As the raw materials for the chlorinated polyolefins, one may use crystalline polypropylene, noncrystalline polypropylene, polybutene, low density polyethylene, high density polyethylene, ethylene-propylene copolymers, ethylenepropylene-diene copolymers and ethylene-vinylacetate copolymers, etc. For introducing a carboxylhydroxy group into a modified polyolefin resin, acid anhydride radicals, such as maleic anhydride, are used. The chlorination of the polyolefins are carried out easily by the former well known reaction method. For example, it may be carried out by a method wherein polypropylene is dissolved in a chlorohydrocarbon, such as carbon tetrachloride, and chlorine gas is introduced into the polypropylene solution, optionally in the presence of a catalyst, or under irradiation by ultraviolet light, optionally under elevated pressure and at a temperature in the range of from normal (room) temperature to 130° C. Component (D) may be a polyolefin modified by maleic acid anhydride.

Modification may be carried out by a method wherein the chlorinated polyolefin is dissolved in a solvent, e.g. an aromatic hydrocarbon, such as toluene, and reacted with maleic acid anhydride at a temperature of from 70° to 120° C., optionally in the presence of a catalyst.

The polyolefin resin compositions according to the present invention may be prepared using a maleic acid anhydride modified chlorinated polyolefin, and the resulting compositions have good adhesive properties and compatibility with other resins especially with acrylic or urethane resins.

The copolymerization reaction of the components (A), (B), (C) and (D) may be carried out using a liquid polymerization method.

The solvent used most preferably in the present invention is an aromatic hydrocarbon, such as toluene or xylene. Other solvents that may be used include esters, ketones, chlorines, aliphatics, cyclic aliphatics and mixtures of any of these.

As a polymerization initiator, one may use a peroxide, such as benzoylperoxide, or an azobis-type compound, such as azobisisobutylonitrile. A typical method of polymerization comprises a procedure wherein a polydiene (B) and a chlorinated polyolefin (D) are diluted by a solvent and mixed. After adding a polymerization initiator, and heating, the acrylic type oligomers (A) and component (C) are gradually added and are allowed to react. However, the coating resin compositions may be obtained by mixing components (A), (B), (C) and (D) and, after adding a polymerization initiator, then heating and allowing the reaction to proceed. The thus obtained compositions have desired characteristics.

As the hardeners, one may use compounds such as polyisocyanates, epoxy resins, polyamines, polyamides or polythiols. In such a case, the hardener must be reactive with the functional radical of the principal constituent. And, in such a case the hardener must be reactive with the functional radicals of the principal constituent of the copolymer properly, for example, if a hydroxyl radical is present in the main constituent of the copolymer, a polyisocyanate, polyamine or polythiol may be used as the hardener.

The actual feed ratio of (A), (B), (C) and (D) used in a particular case will depend on the degree of properties, such as the surface hardness, weather resistance, organic solvent resistance, etc., desired for the product. Thus, by varying the feed ratios of the components (A), (B), (C) and (D), the mix of properties of the final coating composition can be tailored to the intended use. Since the use of some feed ratios may cause compositions to be produced which give coating films having an undesired balance of properties, it is preferable to copolymerize 1-100 parts by weight of (A), 1-300 parts by weight of (B), and 0.5-200 parts by weight of (C) per 100 parts by weight of (D) to achieve optimum results. Typically, the amount of hardener used will be such that there is provided from 0.5 to 5 moles of the functional group of the hardener per 1 mol of the functional group of the resins (calculated as solid) obtained by the copolymerization of (A), (B), (C) and (D). However, in the case where there are relatively few functional groups in the resin obtained by copolymerization, the essential objects of the present invention are attained fully without the use of the hardener, and it would not, therefore, be necessary to use a hardener in the above described case. It is rather advantageous to use one liquid rather than two liquids to save time and equipment.

EXAMPLES

The examples shown below are to be construed, not as limits on the scope of the present invention, but only as representative thereof.

EXAMPLE 1

The under described reagents (1)–(4) are admitted into a flask fitted with a stirrer, a thermometer and a cooling tube, and the air in the flask is thoroughly replaced with $N_2$ and afterward the reaction is carried out in the atmosphere of $N_2$.

(1) HARDLEN 14-LLB, Chlorinated Polyolefin (manufactured by TOYO KASEI KOGYO CO., LTD. weight average molecular weight 30000, chlorine content 27%, solid matter 30%, toluene solution)—100 weight parts.

(2) NISSO polybutadiene G-1000 (manufactured by NIHON SODA CO., LTD) (liquid type polybutadiene number average molecular weight 1000)—15 weight parts.

(3) Toluene—35 weight parts.

(4) Benzoyl peroxide—0.3 grams

Next the temperature of the reaction mixture is raised to 85° C. and the reaction was maintained at 85° C. for two hours.

After mixing well, the system containing the above (1)–(4) reagents, the under described reagents (5)–(8) are added dropwise into the reaction flask for 1 hour.

(5) Praccel FA 4 (acrylic acid oligomer manufactured by DAICEL CHEMICAL CO., LTD.) (hydroxyl value 95, molecular weight 570)—6.0 grams (6) AN-6 (a macromonomer manufactured by TOA GOSEI KAGAKU CO., LTD. specifically, a styrene/acrylonitile macromonomer having a methacryloyl radical at the terminal)—2.0 g (7) AW-6S (manufactured by TOA GOSEI KAGAKU CO., LTD) (Isobutyl methacrylate macromonomer having a methacryloyl radical at the terminal, molecular weight 6000, 50 weight % toluene solution)—1.0g (8) Acrylic acid-2-ethylhexyl After the dropwise addition of the above reagents, benzoylperoxide is further added in amounts of 0.1 g and the mixture agitated for 3 hours at 85° C. and the copolymerization reaction completed over a total period of 6 hours.

The thus-obtained composition is uniform and the appearance is excellent. The non-volatile components of the composition is 12.2 weight %. Then, the thus-obtained composition in an amount of 100 g and $TiO_2$ in an amount of 28 g are dispersed or mixed over a period of 3 hours by means of a bowl mil and then 9.5 g of polyisocyanate, (COLONATE HL Hardener, manufactured by NIHON POLYURETHANE KOGYO CO., LTD.) and 1.0 g of dibutyltinlaurate as the promoting agent are added and the viscosity is regulated by adding toluene such that the viscosity is 13–15 seconds measured by a NO. 4 FORD CUP. A polypropylene plate 1-4 HG (manufactured by MITSUI PETROLEUM CHEMICAL CO., LTD. press molded at 200° C. for 10 minutes) is then dipped into the above described solution, the coated film on the plate is set for 1 hour at room temperature and the coated film tested. The results are summarized in Table 1.

EXAMPLE 2

In this example, the NISSO Polybutadiene G-1000 of Example 1 is substituted by NISSO Polybutadiene TEA 1-3000 (liquid type polybutadiene, number-average molecular weight 3000, manufactured by NIHON SODA CO., LTD.) and polyisocyanate, COLONATE HL is substituted by COLONATE L (manufactured by NIHON POLYURETHANE KOGYO CO., LTD.); otherwise, the other reagents are unchanged. The reagents are copolymerized and coating films made as in Example 1. The coating films are similarly tested as in Example 1 and the results are summarized in Table 1.

EXAMPLE 3:

This example is also the same as Example 1, except HARDLEN 14-LLB is substituted by HARDLEN 13-LB (manufactured by TOYO KASEI KOGYO CO., LTD., chlorinated polypropylene, chlorine content 25%, weight average molecular weight 110,000 solid matter 30 weight %, toluene solution) and PRACCEL FA-4 is substituted by PRACCEL HE-10 (manufactured by NIHON SHOKUBAI KAGAKU KOGYO CO., LTD., an acrylic acid-2-hydroxyl-ethyl oligomer, molecular weight 230). The reagents are copolymerized and coating films are prepared therefrom. The coating films are tested similarly as in Example 1 and the test results are summarized in Table 1.

EXAMPLE 4

This example is the same as Example 1, except HARDLEN 14LLB is substituted by HARDLEN 14-ML (manufactured by TOYO KASEI KOGYO CO., LTD., a maleic acid anhydride modified chlorinated polyolefin, chlorine content 26 weight %, weight average molecular weight 40,000, solid matter 30%, toluene solution).

Praccel FA-4 is substituted by Plenmer AE-350 (manufactured by NIHON YUSHI CO., LTD, an oligomer of polyethylene glycol monoacetate [polymerization grade (n) n=6-8] and AN-6 is substituted by AB-6 (manufactured by TOA GOSEI KAGAKU CO., LTD., which is an acrylic acid butyl macromonomer having a methacryl radical at the terminal and a molecular weight of 6000). The reagents are copolymerized and coating films prepared therefrom. The coating films are tested and the results are summarized in Table. 1.

EXAMPLE 5

This example is the same as Example 1, except HARDLEN 14-LLB was substituted by HARDLEN 12-LLB (manufactured by TOYO KASEI KOGYO CO., LTD., chlorine content 24 weight %, weight average molecular weight 50,000 solid matter 30%, toluene solution), and NISSO G-1000, polybutadiene was substituted by NISSO Polybutadiene EP-1054 (manufactured by NIHON SODA CO., LTD., liquid type polybutadiene number average molecular weight 1000, containing epoxy radicals in the molecule) and the quantity of the latter was changed from 15 weight parts to 30 weight parts. The materials are copolymerized and coating films prepared therefrom. The thus-obtained coated films are tested similarly as in Example 1, and the test results are summarized in Table 1. The copolymerized reaction solution was uniform and the appearance of the solution and the coated film is excellent. The test results are summarized in Table 1.

COMPARATIVE EXAMPLE 1

This examples was carried out as Example 3, except PRACCEL HE 10 was changed to acrylic acid-2-hydroxyethyl, AN-6, 2.0g to a mixture of styrene monomer/acrylonitrile monomer (weight ratio 1/1) 2.0g and AW-6S to an isobutyl methacrylate monomer. The other materials of Example 3 are unchanged. The reagents are copolymerized and coatings prepared therefrom. The coating films are tested and the results are summarized in Table 1.

The polypropylene plates above mentioned are dipped in the copolymerization composition of the Examples 2–5 and Comparative Example 1 alone or dipped in said composition in combination with the polyisocyanate as described in each example so as to produce coating films of 2–5 microns in a dry state by regulating the solution viscosity, drying the films and letting them set, similar to the procedure in Example 1. The coating films are tested as a primer and the results are summarized in Table 1.

TABLE 1

| Examples | 1 | | | 2 | | | 3 | | | 4 | | | 5 | | | Comparative Experiment (1) | | |
|---|---|---|---|---|---|---|---|---|---|---|---|---|---|---|---|---|---|---|
| Uses | A | B | | A | B | | A | B | | A | B | | A | B | | A | B | |
| Hardeners | C | D | E | C | D | E | C | D | E | C | D | E | C | D | E | C | D | E |
| Adhesives (Cross Cut Scotch Tape Test) | ○ | ○ | ○ | ○ | ○ | ○ | ○ | ○ | ○ | ○ | ○ | ○ | ○ | ○ | ○ | ○ | ○ | △ |
| Weather Test (100 Days) | ○ | ○ | ○ | ○ | ○ | ○ | ○ | ○ | ○ | ○ | ○ | ○ | ○ | ○ | ○ | ○ | X | ○ |
| Hot Water Resistant Test* | ○ | ○ | ○ | ○ | ○ | ○ | ○ | ○ | ○ | ○ | ○ | ○ | ○ | ○ | ○ | ○ | X | △ |
| Gasoline Resistant Test** | ○ | ○ | ○ | ○ | ○ | ○ | ○ | ○ | ○ | ○ | ○ | ○ | ○ | ○ | ○ | ○ | △ | △ |
| Pigment Disperse Test | ○ | — | — | ○ | — | — | ○ | — | — | ○ | — | — | ○ | — | — | ○ | — | — |
| Mutual Solubility To The Acrylic Polymer | ○ | ○ | ○ | ○ | ○ | ○ | ○ | ○ | ○ | ○ | ○ | ○ | ○ | ○ | ○ | ○ | ○ | ○ |

Notes:
A = One coat
B = Primer
C = Added COLONATE HL, etc.
D = No COLONATE HL
E = COLONATE HL
○ = Good
△ = Slightly Bad
X = Bad
*Hot Water Resistant Test: at 40° C. for 300 hours
**Gasoline Resistant Test: Rubbing 50 times

TEST METHOD

The test methods used in the present invention are as follows:

(1) Adhesion property (cross cut tape test) 100 Cross cuts which reach the base coat are made at a space of 1mm intervals and a cellophane tape (manufactured by NICHIBAN CO., LTD.) is stuck on the grids and the adhesive property evaluated and determined by the remaining numbers of the grids which exist at the time the adhesive cellophane tape is peeled off perpendicularly.

(2) Weathering Test

Test solutions are coated at a thickness of about 100 microns (resin base) on an acrylic resin plate which has an inclined angle of 45 degrees and dried and said coated acrylic resin plate are fixed on the glass plate with a southern exposure for 100 days and the coated film examined by the grade of coloring of the surface.

(3) Hot Water Resistant Test

Polypropylene plate coated with a solution of the present invention is dipped in 40 degrees hot water for about 300 hours and damage to the appearance of the surface of the coated film is examined.

(4) Gasoline Test

The surfaces of the coated film are rubbed 50 times with gasoline soaked absorbent cotton and the damage to the surfaces of the coated films are examined.

(5) Degree of the dispersion of the pigments

A toluene solution of the main components with the hardener and the promoting agent of the hardener added and are adjusted to a viscosity of to 13-15 seconds with a No. 4 FORD CUP, and the thus adjusted solution is examined by the quantity of precipitation of the pigment and the time of separation of the pigment layer from said toluene solution.

(6) Compatibility for the acrylic polymer

A 10% toluene solution of the coating resin composites or compositions of the present invention are mixed with an acrylic polymer DIANAR BR-115 manufactured by MITSUBISHI RAYON CO., LTD. so that the weight ratio of the toluene solution to the acrylic polymer DIANAR BR-115 is 1:1 and this solution is coated onto the surface of the glass and the compatibility of the solution is examined, based upon the transparency of the dried coated film.

EFFECTS OF THE INVENTION

The effects of the present invention are summarized as follows:

The coating resin reaction products or compositions of the present invention are used to produce hardened coating films by coating such reaction products onto polyolefin type resins or films as a one coat finishing or primer by drying at temperature range of from room temperature to 160° C. The thus-obtained coated films have good adhesiveness to the polyolefin type resins and at the same time the compatibility with other polymers is increased, and so give far better properties than other one coat finishing films. The coating resin compositions of the present invention are superior to coating compositions [published unexamined patent application No. 95373 and No. 95369 (1988) in Japan] which the inventors of the present invention invented in respect to weather resistant properties, humidity resistant characteristics, waterproof properties, gasoline resistant characteristics and in respect to dispersion of the pigments.

The coating resin compositions of the present invention, especially those which include a hardener such as polyisocyanates or polyamines as the main ingredient, improve the hardness, appearance and the luster of the coated film in addition to the above described excellent properties. Moreover, in the case when a maleic acid anhydride is used as a coating element as the main ingredient of the present invention, the compatibility with acrylic resins or urethane resins is far improved.

We claim:

1. A resin coating composition suitable for coating polyolefin resins comprising as main ingredients, a resin obtained by the copolymerization of at least one acrylic oligomer (A), at least one polydiene (B), at least one acrylic monomer (C) and at least one chlorinated polyolefin (D) having a chlorine content of from 10 to 60 weight percent.

2. A coating composition according to claim 1, wherein the hydroxyl value of the resins obtained by the copolymerization of (A), (B), (C) and (D) is in the range of from 10 to 250 mg/g as solid matter, and the acid value of the resins containing carboxyl radicals and/or acid anhydride radicals or amino radicals and carboxyl radicals is in the range of from 5 to 250 KOHmg/g.

3. A coating composition according to claim 1, wherein component (A) comprises
   (i) at least one acrylic oligomer containing one or more than 2 radicals selected from the group consisting of hydroxyl, carboxyl, carboxyl anhydride and amino radicals; or
   (ii) at least one acrylic oligomer containing no functional groups; or
   a mixture of (i) and (ii) above.

4. A coating composition according to claim 1, which additionally contains one or more hardeners capable of reacting with the functional groups of A, B or C.

5. A coating composition according to claim 1, wherein the polydiene (B) is at least one member selected from the group consisting of polybutadiene, polypentadiene, polyisoprene and polychloroprene.

6. A coating composition according to claim 1, wherein the chlorinated polyolefin is one that has been modified by reaction with maleic acid anhydride.

7. A coating composition according to claim 1, which is obtained by copolymerizing 1-100 weight parts of (A), 1-300 weight parts of (B) and 0.5-200 weight parts (C) per 100 weight parts of (D).

* * * * *